US012278063B2

(12) United States Patent
Ruff

(10) Patent No.: US 12,278,063 B2
(45) Date of Patent: Apr. 15, 2025

(54) KEY MODULE FOR A KEYBOARD, AND KEYBOARD

(71) Applicant: Cherry Europe GmbH, Auerbach i. d. Opf. (DE)

(72) Inventor: Eduard Ruff, Auerbach I.D. Opf (DE)

(73) Assignee: CHERRY EUROPE GMBH, Auerbach I.D. Opf (DE)

( * ) Notice: Subject to any disclaimer, the term of this patent is extended or adjusted under 35 U.S.C. 154(b) by 3 days.

(21) Appl. No.: 17/989,902

(22) Filed: Nov. 18, 2022

(65) Prior Publication Data

US 2023/0154700 A1 May 18, 2023

(30) Foreign Application Priority Data

Nov. 18, 2021 (DE) ..................... 10 2021 130 115.7

(51) Int. Cl.
*H01H 3/60* (2006.01)
*H01H 13/7073* (2006.01)
*H01H 13/83* (2006.01)

(52) U.S. Cl.
CPC .............. *H01H 13/83* (2013.01); *H01H 3/60* (2013.01); *H01H 13/7073* (2013.01)

(58) Field of Classification Search
CPC ...... H01H 3/125; H01H 13/705; H01H 13/14; H01H 13/04; H01H 13/10; H01H 13/70; H01H 13/704; H01H 13/7065; H01H 13/7006; H01H 13/7057; H01H 13/78; H01H 13/79; H01H 13/52; H01H 13/703; H01H 13/507; H01H 3/12; H01H 13/20
See application file for complete search history.

(56) References Cited

U.S. PATENT DOCUMENTS

| | | | |
|---|---|---|---|
| 4,753,423 A | 6/1988 | Ukai et al. | |
| 4,859,820 A | 8/1989 | Gotfryd et al. | |
| 10,978,266 B2 | 4/2021 | Lee et al. | |
| 2020/0294733 A1* | 9/2020 | Ruff | H01H 13/7006 |
| 2020/0411257 A1* | 12/2020 | Chang | H01H 13/14 |

FOREIGN PATENT DOCUMENTS

DE 10 2018 102 604 A1 8/2019

* cited by examiner

*Primary Examiner* — Ahmed M Saeed
(74) *Attorney, Agent, or Firm* — Stites & Harbison, PLLC; James R. Hayne

(57) ABSTRACT

What is presented is a key module (120) for a keyboard (100). The key module (120) comprises at least one guide unit (230) formed to guide movement of an actuation unit (125) of the key module (120) between a rest position actuated position upon actuation of the key module (120). The key module (120) also comprises at least one spring element (240) for biasing the actuation unit (125) of the key module (120) into the rest position. The key module (120) further comprises means (315) for dampening mechanical vibrations of the spring element (240) at least when the actuation unit (125) is in the rest position.

8 Claims, 8 Drawing Sheets

KEY MODULE FOR A KEYBOARD, AND KEYBOARD

The present invention relates to a key module for a keyboard and to a keyboard having at least one such key module.

In keyboards, such as ones used in connection with computers, for example, different key systems may be employed. Here, in particular, compression springs or tension springs may be employed as reset mechanism. Such springs key modules may possibly be set to vibration, which in turn may lead to undesirable acoustic properties of keyboards.

Against this background, the present invention provides an improved key module for a keyboard and an improved keyboard in accordance with the main claims.

Advantageous embodiments are obvious from the dependent claims and the subsequent description.

According to embodiments of the approach described here, in particular with respect to a spring of a key module for a keyboard, mechanical vibrations can be dampened, in order to prevent vibrations of the spring body or spring element from developing, and additionally or alternatively in order to dampen or minimize possibly existing vibrations. Such vibration dampening may be realized in at least a portion of an actuation path or key travel path, for example.

Advantageously, according to embodiments, in particular, vibrations of springs can be prevented or vibrations already present can be dampened effectively, in order to also avoid development of sound waves. Hence, for example, vibrations of the spring can be dampened, and thus a freely vibrating system due to an elastic spring body can be prevented. Consequently, in particular, energy of mechanical excitation can be transformed to heat through mechanical friction by the dampening device, and conditions conducive to the development of free vibrations can be eliminated.

According to embodiments, in particular, a spring body of a compression spring or tension spring can be prevented from being set to vibrations when suddenly loaded or unloaded or when laterally excited, for example. Such mechanical vibrations may occur along a spring body axis as longitudinal vibrations or transversal to the spring body axis as transversal vibrations. Windings of the spring in a middle portion thereof may reach maximum amplitude. By way of the vibration damping, in particular, the vibrations can be prevented from being transformed to acoustic sound waves or from being transmitted to adjoining components, such as housing components or the like, as structure-borne sound. By way of the vibration damping, it can also be avoided that vibrations can act in housing components as acoustic bodies, produce resonances and generate amplified sound waves. Since neighboring key modules or key switches may have almost identical springs, for example, a resonance frequency of all or many of the key module is arranged on the keyboard may be identical. Furthermore, by way of the vibration damping, it can be prevented that vibration transmission to all or several key modules of the keyboard excites the springs thereof, and thus possibly all or many key modules produce sound waves and an overall soundscape would be impaired.

A key module for a keyboard is presented, wherein the key module comprises:

- at least one guide unit formed to guide movement of an actuation unit of the key module between a rest position and an actuated position upon actuation of the key module;
- at least one spring element for biasing the actuation unit of the key module into the rest position; and
- means for dampening mechanical vibrations of the spring element at least when the actuation unit is in the rest position.

The keyboard may be provided for a computer or the like, for example. The keyboard may comprise at least one key module. The key module may be part of a key or represent a key. Thus, one key module may be provided per key. The key module may also be referred to as a mechanical key module or as a mechanical pushbutton. The at least one spring element may also be referred to as elastic means. In the rest position of the actuation unit, the key module, and thus the key, may be in a non-actuated state. In the actuated position of the actuation unit, the key module, and thus the key, may be in a completely actuated state. An actuation path or key travel path of the key module may extend between the rest position and the actuated position. The rest position and the actuated position may here represent endpoints of the actuation path. The means for dampening may also be referred to as at least one dampening device. The means for dampening may be arranged, configured and additionally or alternatively formed to directly act on the at least one spring element.

Also, the means for dampening may be configured to dampen the mechanical vibrations of the spring element during the entire movement of the actuation unit between the rest position at the actuated position. Such an embodiment offers the advantage that the vibrations can be prevented and additionally or alternatively minimized in a particularly reliable and safe way.

According to an embodiment, the means for dampening may comprise at least one damper element that may be formed to contact and additionally or alternatively elastically deform at least a portion of the spring element. In particular, the damper element may be formed and additionally or alternatively arranged to contact and additionally or alternatively elastically deform at least a central portion of the spring element arranged between both end portions of the spring element. The at least one damper element may here be attached to at least one component of the key module or integrally formed with at least one component of the key module. Such an embodiment offers the advantage that the vibration damping can be realized in a simple and inexpensive way, without necessitating modification of the spring element.

Herein, the key module may comprise a keycap as actuation unit. The spring element may be formed as a tension spring. The guide unit may comprise two wing elements, between which the spring element is stretched in an assembled state of the key module. The keycap may be coupleable or coupled to the wing elements. The damper element may be arranged on the keycap. The guide unit may be configured as a double-wing mechanism. Such an embodiment offers the advantage that spring vibrations in a key module with tension spring and low profile or flat construction height can be dampened effectively.

Herein, the damper element may be formed as at least one web of the keycap, which extends in a manner offset from a spring body axis of a spring body of the spring element along the spring body axis in an assembled state of the key module. The web may be formed to protrude from the keycap with a web height along actuation axis of the actuation. Here, the web height may be constant along the spring body axis. Alternatively, the web height along the spring body axis may have a maximum in a central region and minima in both end regions of the web. The web may extend over at least a portion of a length of the spring body of the spring element along the spring body axis. Such an embodiment offers the advantage that vibrations of the spring element can be dampened inexpensively, safely and reliably by the web, wherein the required constructive space of the key module remains unaffected thereby. The dampening may also be realized by means of several webs. Here, the webs may contact or elastically deform the spring element from the same side or alternatively from opposite sides.

Also, the damper element and the spring element may here be arranged and formed to force the keycap in the rest position unilaterally into abutment against the wing elements of the guide unit in the assembled state of the key module. Thereby, lateral clearance between the keycap and the wing mechanism or guide unit can be eliminated, and possible "clattering" or "rattling" of the keycap in the rest position can be inhibited.

Alternatively, the key module may comprise a key tappet as the actuation unit, wherein the key tappet is coupleable or coupled to a keycap, and a housing for at least partially accommodating the spring element and the key tappet. The guide unit may comprise a guide pin of the housing and a guide sleeve of the key tappet. The spring element may be formed as a compression spring. The at least one damper element may be arranged on the housing and additionally or alternatively on the key tappet. The spring element may be arranged between the key tappet and the housing. Such an embodiment offers the advantage that effective vibration damping can be realized also for a key module with a compression spring and a higher profile or greater constructive height.

Herein, the at least one damper element may be formed as at least one glide fin, which extends in a manner offset from a spring body axis of a spring body of the spring element along the spring body axis in an assembled state of the key module. Here, the spring body axis may extend along an actuation axis of the actuation. Additionally, audio is or facts can be employed to minimize friction between windings of the spring element and the glide fin. Such an embodiment offers the advantage that vibrations of the spring element can be dampened inexpensively and reliably with a given constructive space of the key module.

Furthermore, the at least one damper element may here be formed on the housing, in particular on the guide pin of the housing. The at least one damper element may be formed to contact and additionally or alternatively elastically deform the spring element radially from inside. Additionally or alternatively, the at least one damper element may be formed on the key tappet, in particular on the guide sleeve of the key tappet. The at least one damper element may be formed to contact and additionally or alternatively elastically deform the spring element radially from outside. Such an embodiment offers the advantage that contacting of the spring may take place from the outside or the inside of the spring body, wherein a combination of opposing contacts from the outside and the inside is possible.

According to an embodiment, the means for dampening may comprise a medium with which at least the spring element is wetted. The medium may be a gel-like medium, a paste-like medium, a liquid or a fatty medium. Upon vibration of individual windings of the spring element, this medium may repeatedly be accelerated and decelerated in opposite directions, wherein the medium may repeatedly be plastically formed due to the moment of inertia, which requires energy. Thus, a transformation of energy can be achieved from mechanical vibration energy to thermal energy, wherein the vibrations may decay very quickly. In addition, the medium may also be applied between the spring element and the guide pin and additionally or alternatively between the spring element and the guide sleeve, for example. Through winding movement of windings of the spring element, medium located there may be formed continuously, and the vibration energy may be dampened additionally.

According to an embodiment, the means for dampening may comprise a material layer with which the spring element is coated at least partially. The material layer may comprise a material having tensile strength lower than tensile strength of a material of the spring element. If a spring wire of the spring element is coated with a material having high internal friction or with a material having low tensile strength, in particular of tin, zinc, copper, silver, plastic or silicone, this may lead to the formation of the coating with each vibration, wherein internal friction may be produced, vibration energy may be transformed to thermal energy, and vibrations may decay. The coating of the spring element may also be realized such that the material layer forms a sheathing around the spring wire of the spring element. Relative movement may occur between the outer sheathing and the spring wire, wherein vibration energy may be reduced and free vibrations may decay due to frictional force between sheathing and wire.

What is also presented is a keyboard, wherein the keyboard comprises:

at least one exemplar of an embodiment of the key module mentioned herein; and

A circuit substrate, wherein the at least one key module is arranged on the circuit substrate.

Thus, at least one key module mentioned herein may be employed or used in connection with the keyboard. The at least one key module may be attached directly to the circuit substrate, for example by means of soldering or plugging contact pins in.

The invention shall be explained in greater detail by way of example on the basis of the attached drawings, in which.

In the subsequent description of preferred embodiments of the present invention, the same or similar reference numerals shall be used for the similarly acting elements depicted in the various figures, wherein repeated description of these elements shall be omitted.

Figure 1:
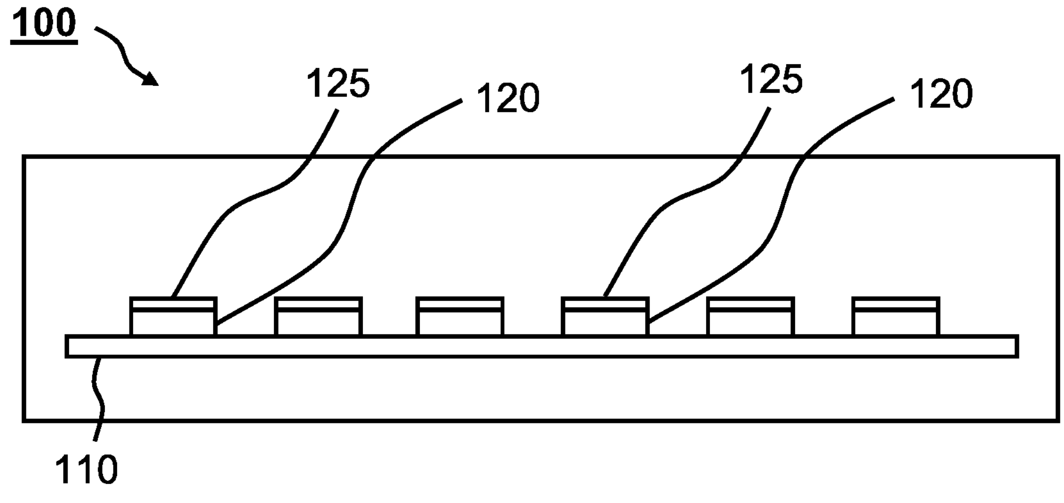
FIG. 1 shows a schematic illustration of a keyboard with key modules, according to an embodiment of the present invention.

FIG. 1 shows a schematic illustration of a keyboard 100 with key modules 120, according to an embodiment. The keyboard 100 is part of a notebook computer, laptop computer or the like, for example. Alternatively, the keyboard 100 also is configured as a peripheral device for a computer, in particular.

The keyboard 100 comprises a circuit substrate 110. The circuit substrate 110 is a circuit board, conductor board or the like, for example. According to the embodiment illustrated in FIG. 1, the keyboard 100 comprises a plurality of key modules 120. The key modules 120 are arranged on the circuit substrate 110. Here, the key modules 120 are soldered onto the circuit substrate 110, for example.

Furthermore, according to the embodiment shown and described in FIG. 1, a keycap 125 is attached to each key module 120. Here, each keycap 125 is coupled to a key module 120 of its own. Each unit of key module 120 keycap 125 represents a key of the keyboard 100. Alternatively, each key module 120 represents a key of the keyboard 100. Particularly the key modules 120 shall be explained in greater detail with reference to subsequent figures.

The keycap 125 represents a part of a key that is visible and touchable for a user of the keyboard 100. Actuation of a key module 120 is effected by pressing onto the keycap 125. Each key module 120 is configured to react to an actuation force with a force-path characteristic of resistance or a reset force by at least one spring element. Furthermore, each key module 120 is configured to establish an electrical connection responsive to actuation with a pre-definable actuation path, wherein a switching process is executed.

Figure 2:
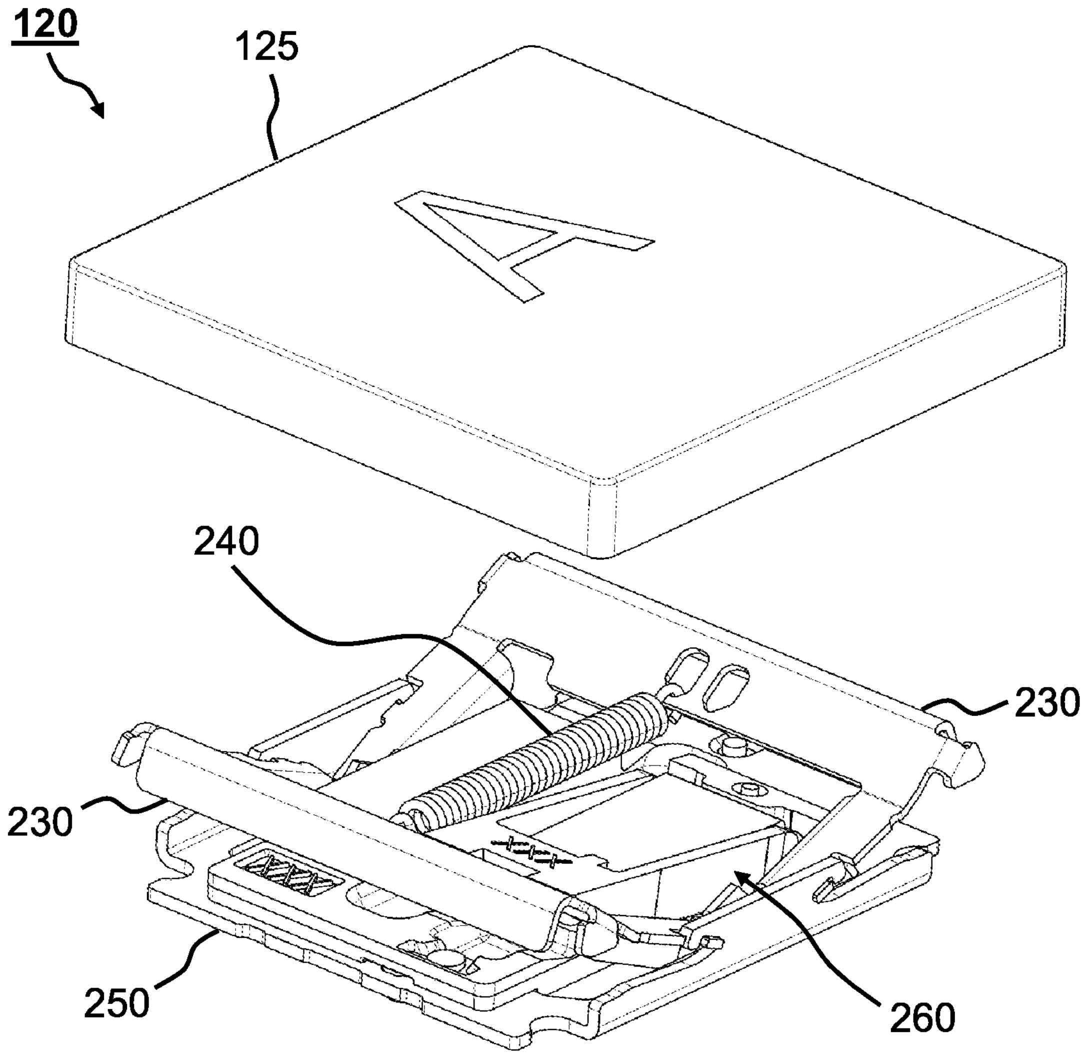
FIG. 2 shows a partially exploded view of a key module, according to an embodiment of the present invention.

FIG. 2 shows a partially exploded view of a key module 120, according to an embodiment of the present invention. The key module 120 here corresponds to or is similar to one of the key modules from FIG. 1. The key module 120 comprises a guide unit 230 formed to guide movement of an actuation unit of the key module 120 between a rest position and in an actuated position upon actuation of the key module 120. Furthermore, the key module 120 comprises a spring element 140 for biasing the actuation unit of the key module 120 into the rest position. Even though not visible in FIG. 2 for illustrative reasons, the key module 120 also comprises means for dampening mechanical vibrations of the spring element 140 at least when the actuation unit is in the rest position.

According to the embodiment illustrated in FIG. 2, the key module 120 also comprises the keycap 125. The keycap 125 here functions as actuation unit. The spring element 240 is formed as a tension spring. The guide unit 230 comprises two wing elements, between which the spring element 240 is stretched in an assembled state of the key module 120. The keycap 125 is coupleable to the wing elements. In a state in which the keycap 100 to 25 is mounted to the key module 120, the key module 120 and the keycap 125 represent a key. At least one alphanumerical character or special character is printed on the keycap 125.

According to the embodiment illustrated in FIG. 2, the means for dampening include at least one damper element arranged or formed on the keycap 125. The means for dampening or the damper element shall be explained in greater detail in the following with reference to subsequent figures.

The key module 120 comprises a first wing element and a second wing element as actuation unit 230 for guiding a movement of the key module 120 upon actuation by a user. The two wing elements are mechanically coupled to each other. In the illustration of FIG. 2, the wing elements are shown in a non-actuated state of the key module 120. In the non-actuated state, the wing elements mechanically coupled to each other span an obtuse resting angle between themselves. In an actuated state of the key module 120, the wing elements coupled to each other span an opening angle greater than the resting angle between themselves. The opening angle may also be 180 degrees. A difference between the resting angle and the opening angle may range from about 12 degrees to 18 degrees, for example.

Each wing element of the guide unit 230 comprises a bar, a first arm and a second arm. The arms extend away from the bar. In particular, the arms extend away from the bar at right angles. Also, the arms extend in parallel with respect to each other within a tolerance range, for example. Alternatively, the arms may also extend obliquely with respect to each other. According to the embodiment illustrated in FIG. 2, the first wing element and the second wing element are formed to be identical with each other. In addition, each wing element is integrally formed here. For example, each wing element is also formed of a metal material.

According to the embodiment shown and described in FIG. 2, each of the wing elements of the guide unit 230 comprises two mounting portions for mounting the spring element 240 and two bearing portions for bearing the wing element, for example. The mounting portions are formed on the bar of the wing element. The mounting portions are formed as through-holes, particularly as rounded triangular through-holes, in the wing element. The bearing portions are formed on the arms of the wing element. A first bearing portion is formed on the first arm, and a second bearing portion is formed on the second arm. The bearing portions are formed as ledges, steps or noses in outside edges of the arms of the wing element.

Each wing element of the guide unit 230 also comprises at least one connecting portion for connecting the wing element to the keycap 125. According to the embodiment illustrated in FIG. 2, each wing element comprises one connecting portion, for example. The connecting portion is formed on the bar of the wing element. The keycap 125 is connectable to the wing elements via a snap-fit by means of the connecting portions.

The spring element 240 is formed to provide a reset force upon actuation of the key module 120. According to the embodiment illustrated in FIG. 2, the key module 120 comprises one spring element 240, for example. The spring element 240 is mounted to one of the mounting portions of the first wing element and two one of the mounting portions of the second wing element. Here, the spring element 240 is configured as a tension spring.

The key module 120 also comprises a support element 250 for supporting the wing elements of the guide unit 230. The support element 250 is also formed to support the spring element 240 and the keycap 125 when they are attached to the wing elements 230. For example, the support element 250 is formed of a metal material. The support element 250 comprises a plurality of accommodating portions for accommodating the bearing portions of the wing elements. According to the embodiment shown and described in FIG. 2, the support element 250 here comprises four accommodating portions. The accommodating portions are formed as bearing grooves in the support element 250. In other words, the accommodating portions are formed to be groove-shaped, v-shaped or swallow-tailed. The bearing portions of the wing elements are supported in the accommodating portions in a mounted state of the key module 120. Thus, the wing elements are supported on the support element 250 so as to be pivotable or tiltable in a pre-definable angle range. The angle range is also definable by a shape of the accommodating portions.

Moreover, the key module 120 comprises a switch unit 260. The switch unit 260 comprises a housing and a contact device. The contact device is at least partially arranged in the housing. In other words, the housing is formed to accommodate at least a portion of the contact device. According to the embodiment shown in FIG. 2, for example only one groove for accommodating at least a portion of the spring element 240 in an actuated state of the key module 120 is formed in the housing. The contact device is configured to establish electric contact in the course of actuation of the key module 120. The contact device can be pressed or deformed by the keycap 125, for example, in order to effect the establishment of the electric contact.

Figure 3:
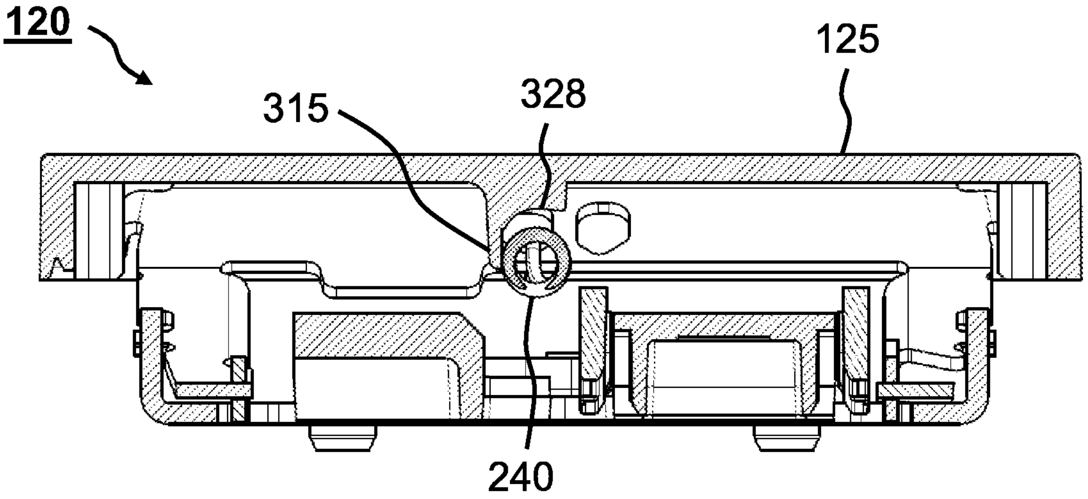
FIG. 3 shows a partially sectional illustration of the key module of FIG. 2.

FIG. 3 shows a partially sectional illustration of the key module 120 of FIG. 2. The keycap 125 with a cam 328, the spring element 240 and the damper element 315 are shown of the key module 120 in FIG. 3. The damper element 315 is arranged on the keycap 125, more specifically it is formed as a part thereof. According to the embodiment illustrated here, the damper element 315 is formed adjacent to the cam 328 or as part of the cam 328. The damper element 315 is formed and arranged to contact and/or elastically deform at least a portion of the spring element 240. According to an embodiment, the means for dampening or the damper element 315 is configured to dampen the mechanical vibrations of the spring element 240 over the entire movement of the actuation unit, here particularly the keycap 125, between the rest position and the actuated position.

The cam 328 is formed as a portion of the keycap 125. More specifically, the cam 328 is formed as a portion of the keycap 125 protruding toward the spring element 240. The cam 328 is formed to deform, more specifically to elastically deform, the spring element 240 in an actuated state of the key module 120. With increasing actuation path during actuation of the key module 120, the spring element 240 is deformable by the cam 328. Here, the cam 328 is formed and arranged to bend the spring element 240. When being bent by the cam 328, spring force of the spring element 240 loses linearity, with a reset force acting against an actuation force or a resistance acting against an actuation force increasing due to the deformed spring element 240.

Figure 4:
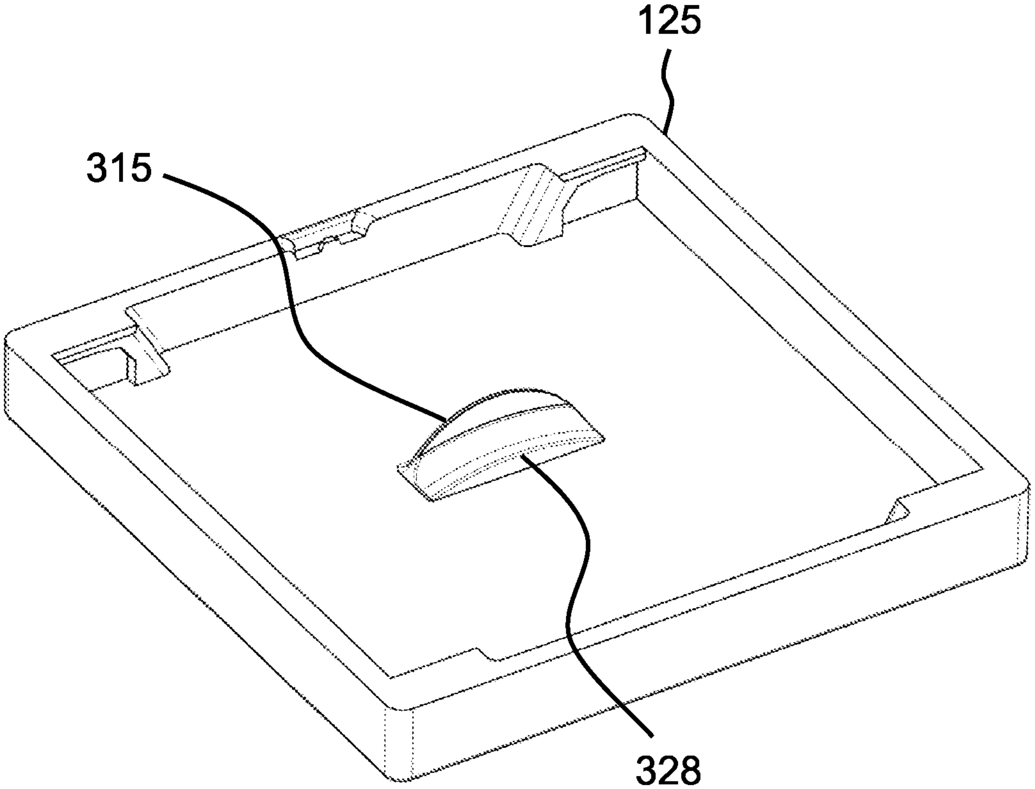
FIG. 4 shows an oblique bottom view of the keycap of the key module of FIG. 2 or FIG. 3.

FIG. 4 shows an oblique bottom view of the keycap 125 of the key module of FIG. 2 or FIG. 3. Here, the damper element 315 is shown, in particular. Furthermore, the cam 328 is shown. According to the embodiment illustrated here, the damper element 315 is formed as at least one web of the keycap 125, extending in a manner offset from a spring body axis of a spring body of the spring element 240 along the spring body axis in an assembled state of the key module 120.

Figure 5:
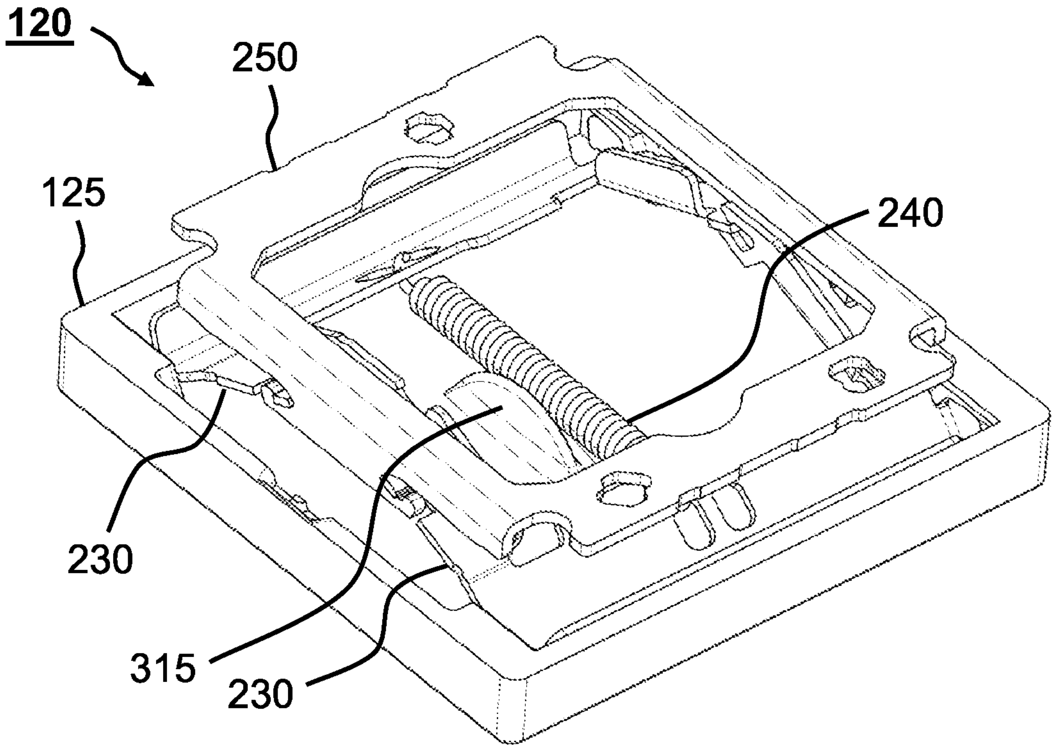
FIG. 5 shows an oblique bottom view of parts of the key module of FIG. 2 or FIG. 3.

FIG. 5 shows an oblique bottom view of parts of the key module 120 of FIG. 2 or FIG. 3. The keycap 125, the guide unit 230, the spring element 240, the support element 250 and the damper element 315 are shown of the key module 120 in FIG. 5.

Figure 6:
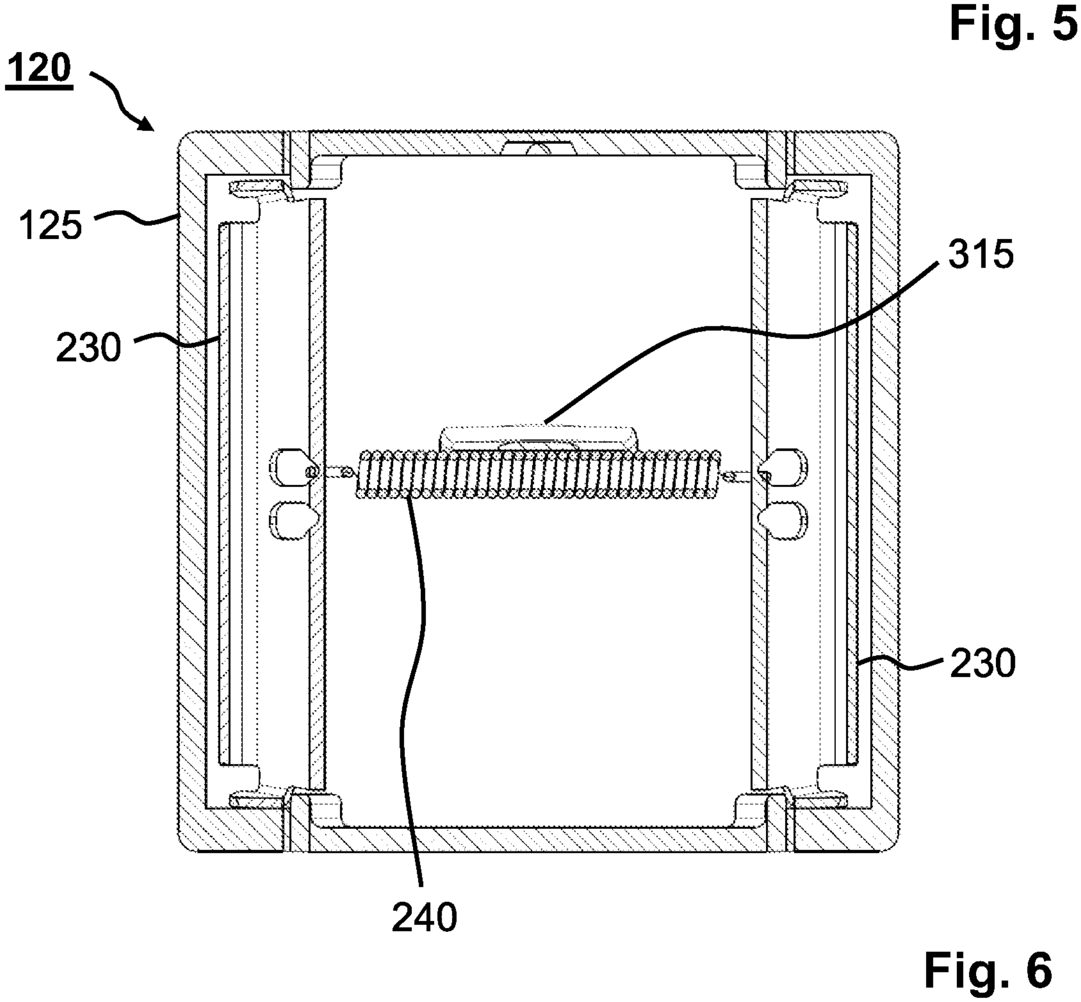
FIG. 6 shows a partially sectional illustration of the key module of FIG. 2, FIG. 3 or FIG. 5.

FIG. 6 shows a partially sectional illustration of the key module 120 of FIG. 2, FIG. 3 or FIG. 5. The keycap 125, the guide unit 230, the spring element 240 and the damper element 315 are shown of the key module 120 in FIG. 6. It can also be seen that the damper element 315 contacts the spring element 240.

Figure 7:
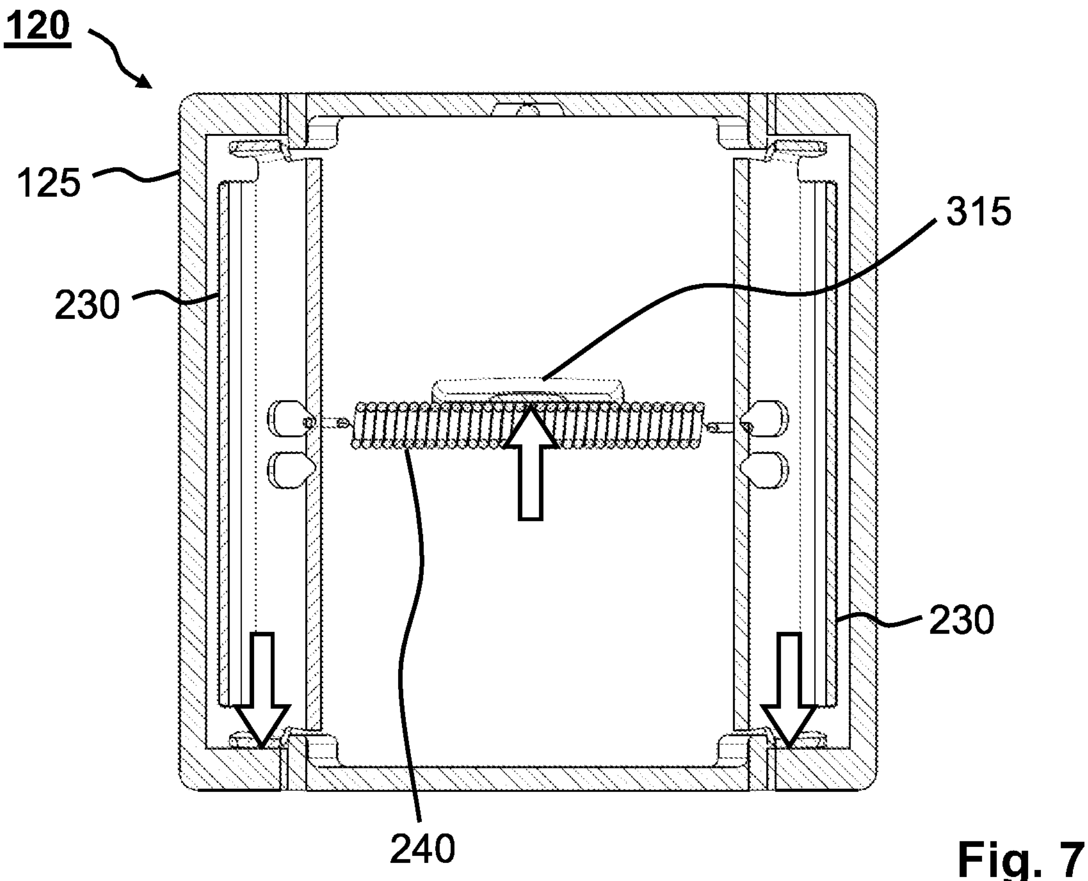
FIG. 7 shows a partially sectional illustration of the key module of FIG. 2, FIG. 3, FIG. 5 or FIG. 6.

FIG. 7 shows a partially sectional illustration of the key module 120 of FIG. 2, FIG. 3, FIG. 5 or FIG. 6. The illustration in FIG. 7 here corresponds to the illustration of FIG. 6, except that arrows representing further interaction between the damper element 315 and the spring element 240 are depicted additionally. The further interaction consists in the keycap 125 being forced out of center in the rest position by the spring element 240 and the damper element 315. Here, the damper element 315 and the spring element 240 are arranged and formed to force the keycap 125 in the rest position into unilateral abutment against the wing elements of the guide unit 230. In other words, the guide areas of the wing elements of the guide unit 230 are pressed against a side wall of the keycap 125, more specifically a sidewall illustrated at the bottom in FIG. 7. Thereby, a lateral clearance between keycap 125 and wing mechanism or guide unit 230 can be eliminated, and possible “clattering” or “rattling” of the keycap 125 in the rest position can be inhibited.

With reference to FIGS. 2 to 7, it is to be noted that the damper element 315 can prevent the spring element 240, which is configured as a tension spring here, from being excited transversally to the spring axis in the case of a sudden switch back or a sudden movement from the direction of the actuated position toward the rest position, and from transferring the vibrations to the keycap 125 or housing components of a keyboard, where they could otherwise be transformed into sound waves. The vibration damping is achieved by the fact that the spring windings, particularly the central windings, of the spring element 240 are in mechanical contact with the damper element 315, which is configured as a web in the keycap 124, during the entire actuation path of the key module 120, for example.

Figure 8:
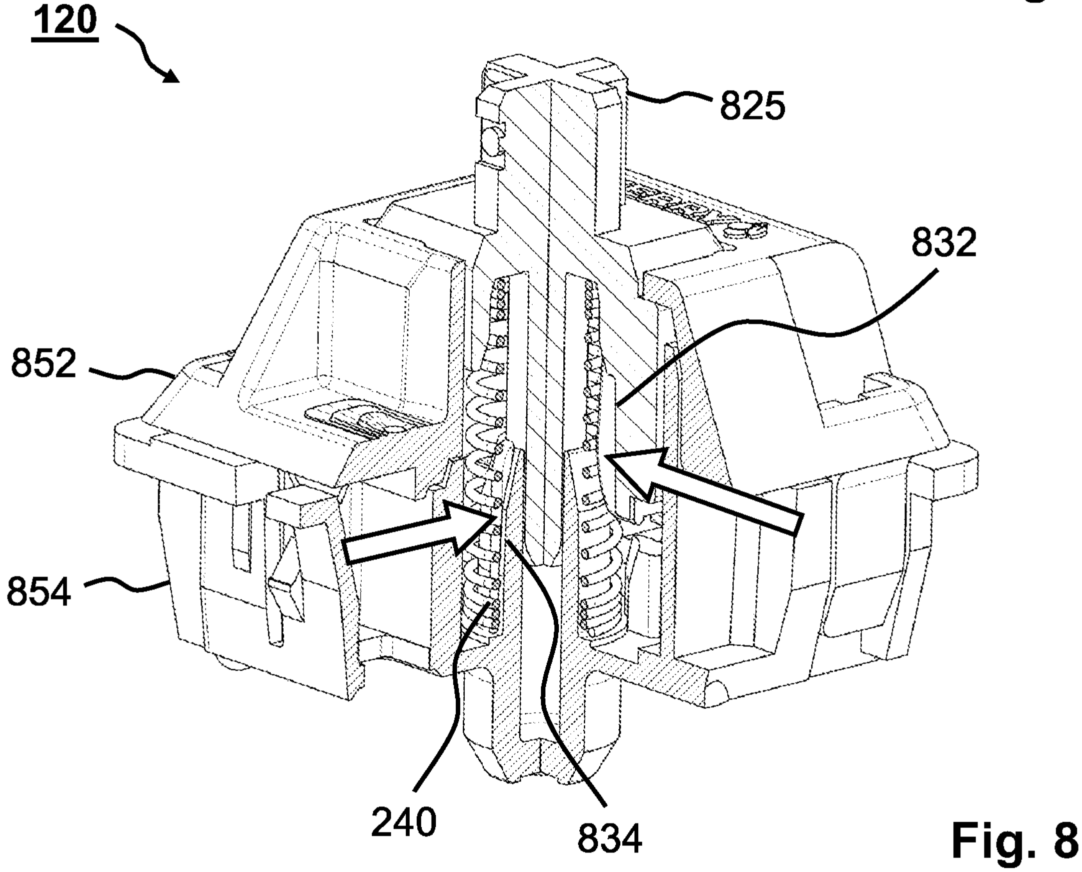
FIG. 8 shows a partially sectional illustration of a key module, according to an embodiment of the present invention.

FIG. 8 shows a partially sectional illustration of a key module 120 according to an embodiment of the present invention. The key module 120 here corresponds to or is similar to one of the key modules from FIG. 1. The key module 120 comprises a guide unit 832, 834, which is formed to guide movement of an actuation unit of the key module 120, which is configured as a key tappet 825, between a rest position and in actuated position when the key module 120 is being actuated. Furthermore, the key module 120 comprises a spring element 140 for biasing the actuation unit 825 of the key module 120 into the rest position. Even though it is not shown explicitly in FIG. 8, the key module 120 also comprises means for dampening mechanical vibrations of the spring element 240 at least when the actuation unit is in the rest position. According to the embodiment illustrated here, the means for dampening comprise at least one damper element, which is formed to contact and/or elastically deform at least a portion of the spring element 240. In particular, the means for dampening are configured to dampen the mechanical vibrations of the spring element 240 over the entire movement of the key tappet 824 between the rest position and the actuated position.

The key tappet 825 functions as actuation unit. The key tappet 825 is coupleable to a keycap. The key module 120 also comprises a housing of a housing lid 852 and a housing base 854 for at least partially accommodating the spring element 240 and the key tappet 824. The spring element 240 is formed as a compression spring. The guide unit of the key module 120 includes a guide pin 834 of the housing, more specifically of the housing base 854, and a guide sleeve 832 of the key tappet 825. Guiding the movement of the key tappet 825 relative to the housing 852, 854 results from engagement of the guide sleeve 832 and guide pin 834. The at least one damper element is arranged on the housing, more specifically the housing base 854, and/or on the key tappet 825.

The means for dampening or the at least one damper element shall be explained in greater detail in the following with reference to subsequent figures. FIG. 8 depicts two arrows illustrating possible regions of interaction between the means for dampening and the spring element 240.

Figure 9:
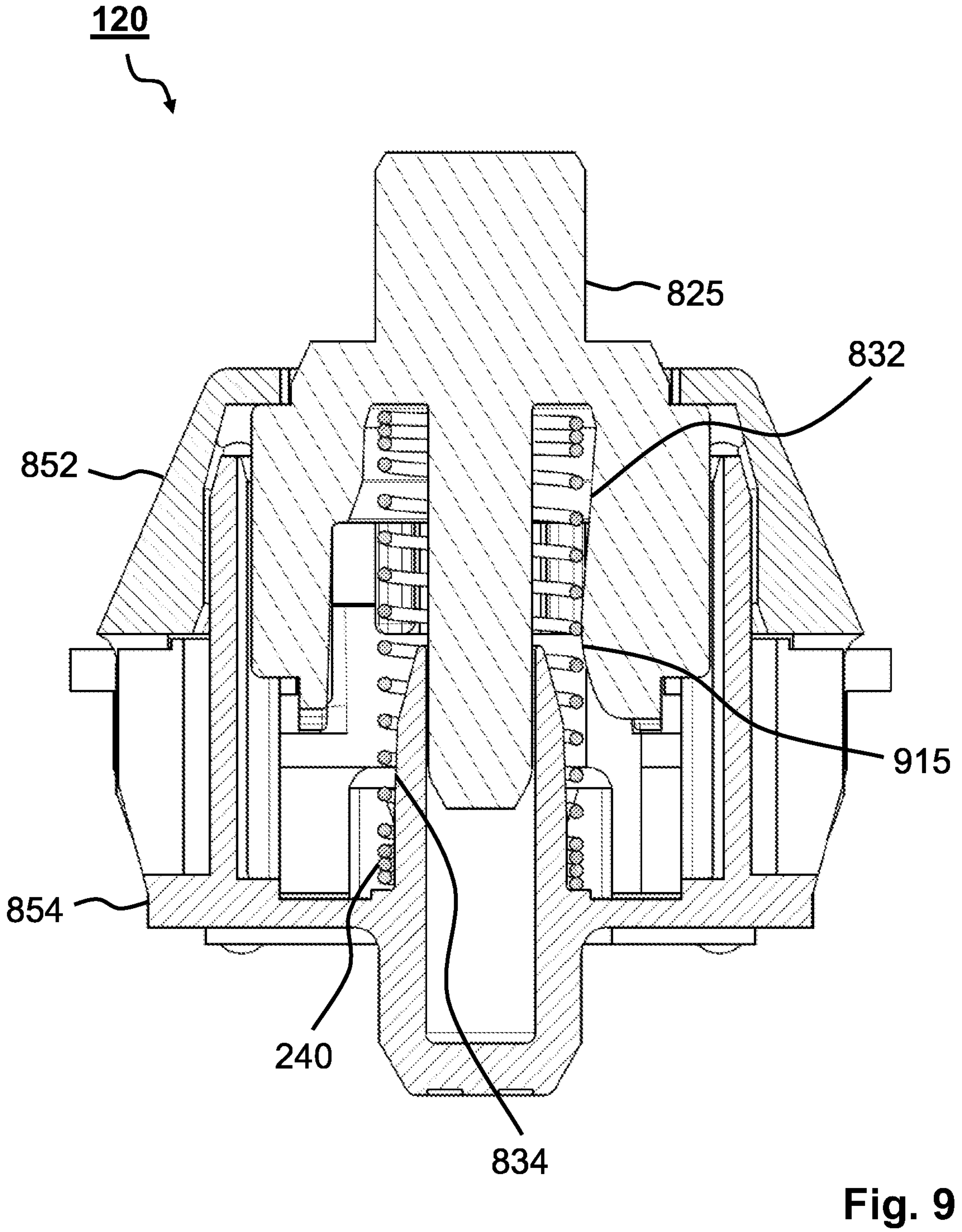
FIG. 9 shows a partially sectional illustration of the key module of FIG. 8.

FIG. 9 shows a partially sectional illustration of the key module 120 of FIG. 8. The key module 120 in FIG. 9 here corresponds to or is similar to the key module from FIG. 8. In addition to the elements of the key module 120 illustrated in FIG. 8, FIG. 9 also shows a damper element or tappet-side damper element 915. The tappet-side damper element 915 is formed on the key tappet 825, more specifically on the guide sleeve 832 thereof. The tappet-side damper element 915 is formed to contact and/or elastically deform the spring element 240 radially from outside or from without.

Figure 10:
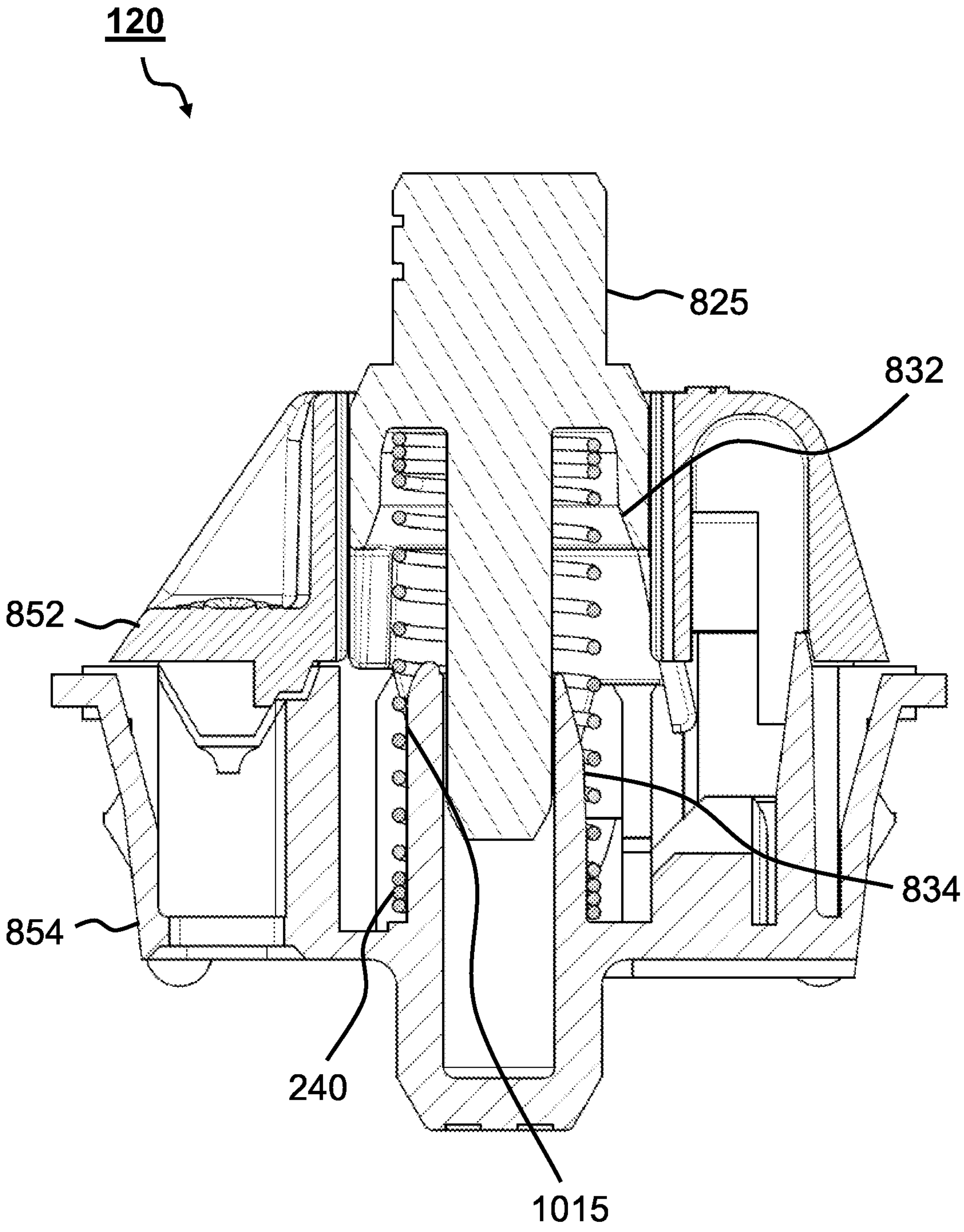
FIG. 10 shows a partially sectional illustration of the key module of FIG. 8 or FIG. 9.

FIG. 10 shows a partially sectional illustration of the key module 120 of FIG. 8 or FIG. 9. The key module 120 in FIG. 10 here corresponds to or is similar to the key module from FIG. 8. Additionally or alternatively to the tappet-side damper element shown in FIG. 9, the key module 120 includes another damper element or housing-side damper element 1015. The housing-side damper element 1015 is formed on the housing 852, 854, more specifically on the guide pin 834. The housing-side damper element 1015 is formed to contact and/or elastically deform the spring element 240 radially from inside or from within.

Figure 11:
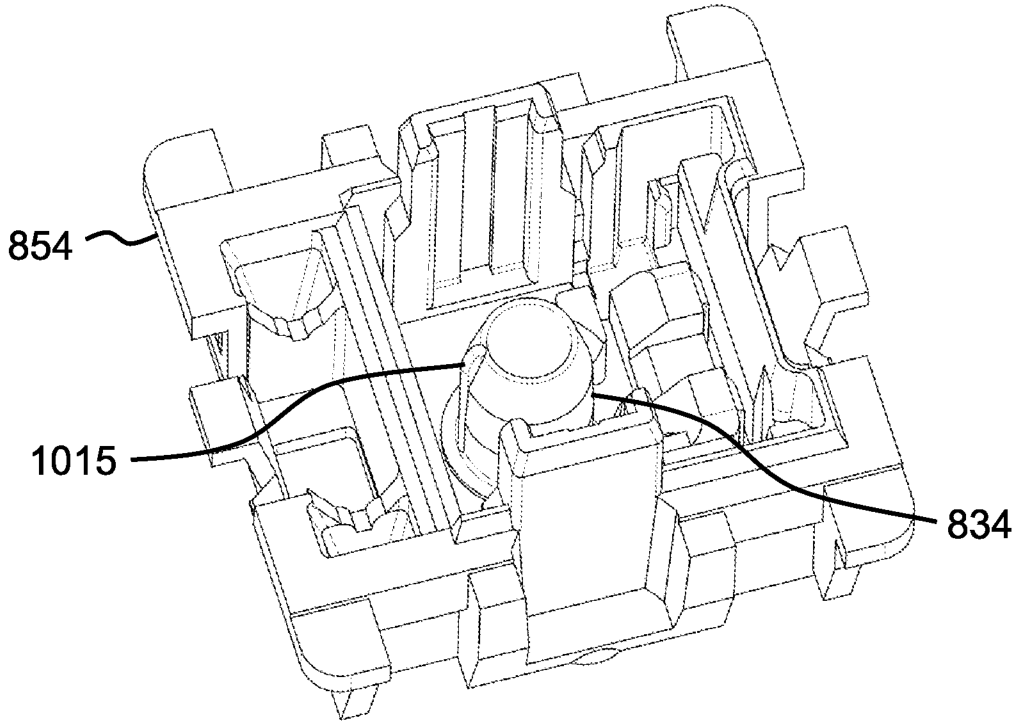
FIG. 11 shows an oblique top view onto a housing part of the key module of FIG. 8, FIG. 9 or FIG. 10.

FIG. 11 shows an oblique top view onto a housing component of the key module of auf FIG. 8, FIG. 9 or FIG. 10. The housing component shown in FIG. 11 is the housing base 854. Furthermore, FIG. 11 illustrates the guide pin 834 and the housing-side damper element 1015. The housing-side damper element 1015 is formed as a glide fin, which extends in a manner offset from a spring body axis of a spring body of the spring element along the spring body axis in an assembled state of the key module.

Figure 12:
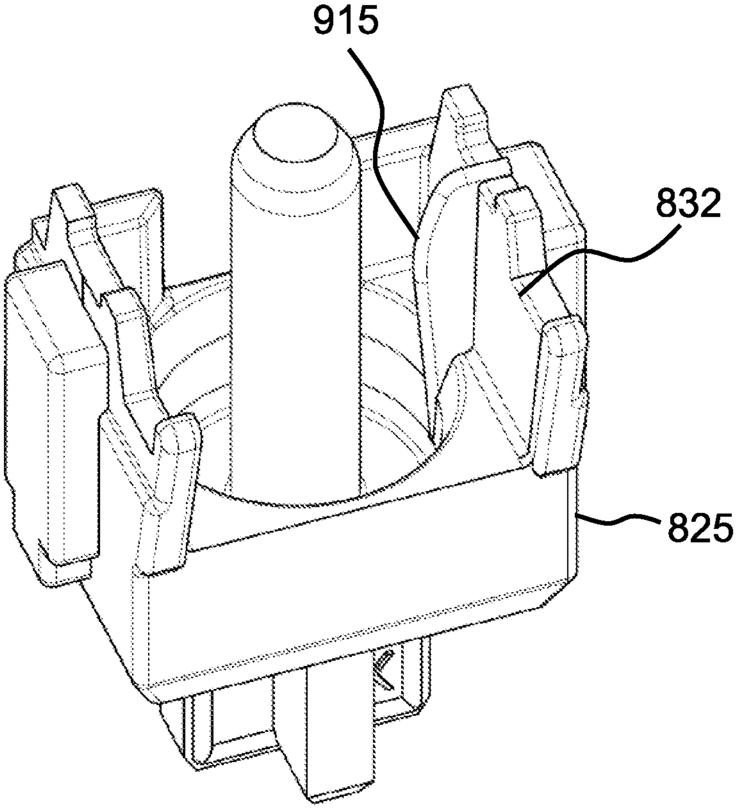
FIG. 12 shows an oblique bottom view of the key tappet of the key module of FIG. 8, FIG. 9 or FIG. 10.

FIG. 12 shows an oblique bottom view of the key tappet 825 of the key module of FIG. 8, FIG. 9 or FIG. 10. FIG. 12 further illustrates the guide sleeve 832 and the tappet-side damper element 915. The tappet-side damper element 915 is formed as a glide fin, which extends in a manner offset from a spring body axis of a spring body of the spring element along the spring body axis in an assembled state of the key module.

With reference to FIGS. 8 to 12, it is to be noted that the vibration damping can also be realized in a reliable manner in a mechanical key module 120 having a compression spring as the reset element or spring element 240. In particular, the difference is that the individual windings of the spring element 240 are set to vibrate in the direction of the spring body axis upon sudden actuation or switch-back. In such a key module 120, there is radial contact or elastic deformation of the spring body of the spring element 240 with a damper element 915 and/or 1015 formed as a glide element, in particular over the entire actuation path. Here, oils or fats may additionally be employed for minimizing wear. The spring may be contacted from the outside or from the inside of the spring body. For example, the guide pin 834 of the housing may be provided with at least one glide fin 1015, which elastically deforms the spring body or at least the central windings of the spring element 240 radially from inside. The glide fin 915 may also be placed in the guide sleeve 832, in this case in the key tappet 825, so as to contact the spring body from outside. A combination of opposing contacts from outside and inside is also conceivable.

Figure 13:
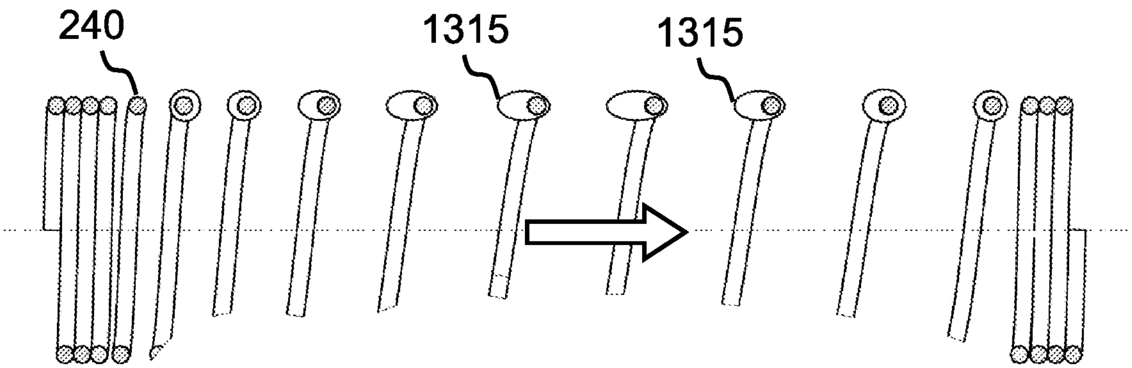
FIG. 13 shows a partially sectional illustration of a spring element of a key module, according to an embodiment of the present invention.
Figure 14:
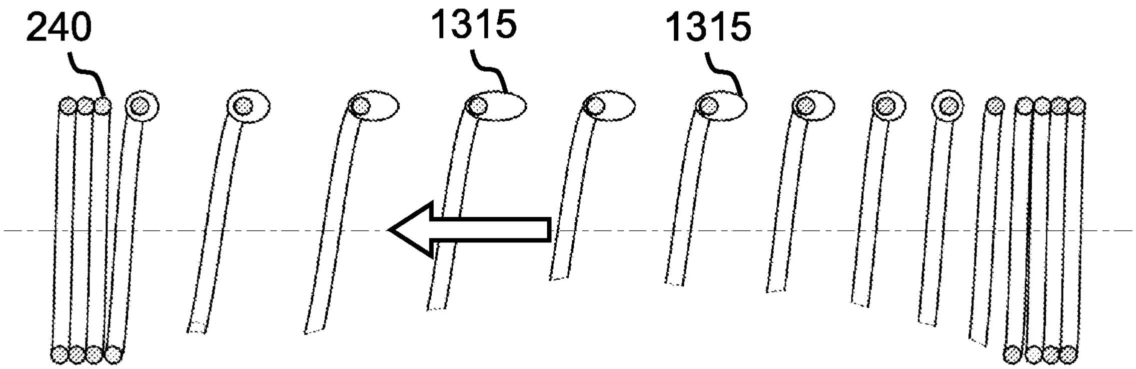
FIG. 14 shows a partially sectional illustration of the spring element of FIG. 13.

FIG. 13 and FIG. 14 shows a partially sectional illustration of a spring element 240 of a key module according to an embodiment of the present invention. The spring element 240 is the spring element from one of the previously described figures or a similar spring element. What is shown as means for dampening is a medium 1315 with which the spring elements 240 is wetted. The medium 1315 is a gel-like medium, a paste-like medium, a liquid or a fatty medium.

The spring body of the spring element 240 is wetted with a gel-like medium 1315, e.g. fat. The medium 1315 has a viscosity such that the medium 1315 adheres well to the spring windings and does not dry out. When the individual windings vibrate, this medium 1315 is repeatedly accelerated and decelerated in opposite directions, as symbolically illustrated by way of arrows in FIG. 13 and FIG. 14. Owing to the moment of inertia, the medium 1315 is repeatedly plastically formed. Energy is required for the forming. Thus, there is energy transformation from mechanical vibration energy to thermal energy. Vibrations of the spring element 240 decay very quickly here. Additionally, the medium 1315, for example the gel-like medium, may also be placed between the spring element 240 and the guide pin or the guide sleeve from one of FIGS. 8 to 12. Through the winding movement, medium 1315 located there is continuously formed, and the vibration energy is dampened in addition.

Figure 15:
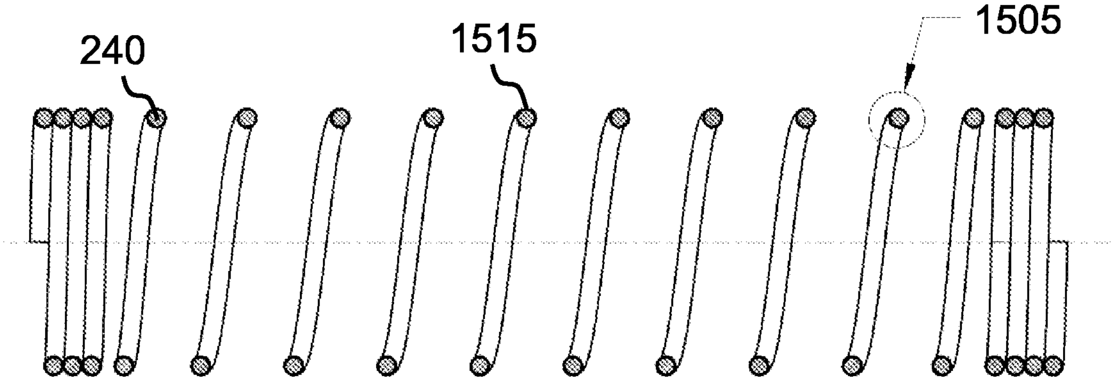
FIG. 15 shows a partially sectional illustration of a spring element of a key module, according to an embodiment of the present invention.

FIG. 15 shows a partially sectional illustration of a spring element 240 of a key module according to an embodiment of the present invention. The spring element 240 is the spring element from one of the previously described figures or a similar spring element. A material layer 1515 with which the spring element 240 is at least partially coated is shown as the means for dampening. The material layer 1515 comprises a material having a tensile strength lower than a tensile strength of a material of the spring element 240. Furthermore, a detail 1505 is marked in FIG. 15.

Figure 16:
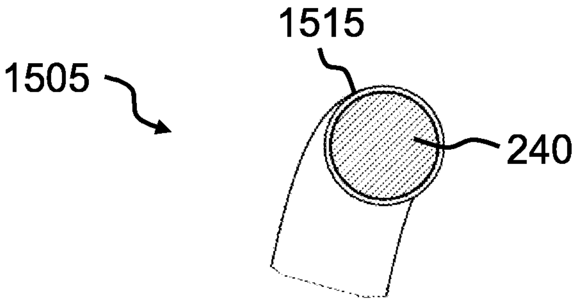
FIG. 16 shows a detail of the spring element from FIG. 15.

FIG. 16 shows the detailed 1505 of the spring element 240 and of the material layer 1515 from FIG. 15. According to the embodiment illustrated in FIG. 15 and FIG. 16, the spring element 240 is coated completely with the material layer 1515.

The spring element 240, which consists of a hard material, e.g. spring steel, is elastically deformed repeatedly by actuation. Due to low internal friction, vibrations may persist for a long time and produce acoustic noise. The wire of the spring element 240 here is stressed with torsion or stressed with rotation. The stress increases concentrically from the center of the wire to the outer skin. This means that material regions on the outer surface of the wire are stressed and deformed the most. If the spring wire of the spring element 240 is coated with a material having high internal friction or a material having low tensile strength, this leads to deformation, particularly plastic deformation, of the material layer 1515 with every vibration. Deformation produces internal friction, the vibration energy is transformed to thermal energy, and the vibrations decay. The material layer 1515 may also be realized such that it forms a coat around the spring wire of the spring element 240. There will then be relative movement between outer coat or material layer 1515 and the spring wire. The frictional force between coat and wire will also decrease the vibration energy and let free vibrations decay.

Where an embodiment comprises an "and/or" connection between a first feature and a second feature, this can be read such that the embodiment comprises both the first feature and the second feature according to a first variant and either the first feature or the second feature only according to a further variant.

REFERENCE NUMERALS

100 keyboard
110 circuit substrate
120 key module
125 keycap
230 guide unit
240 spring element
250 support element
260 switch unit
315 damper element
328 cam
825 key tappet
832 guide sleeve
834 guide pin
852 housing lid
854 housing base
915 tappet-side damper element
1015 housing-side damper element
1315 medium
1505 detail
1515 material layer

The invention claimed is:

1. Key module for a keyboard, wherein the key module comprises:

at least one guide unit formed to guide movement of an actuation unit of the key module between a rest position and an actuated position upon actuation of the key module;

at least one spring element for biasing the actuation unit of the key module into the rest position; and means for dampening mechanical vibrations of the spring element at least when the actuation unit is in the rest position;

wherein the means for dampening comprise at least one damper element integrally formed with at least one component of the key module, the at least one damper formed to contact and elastically deform at least a portion of the spring element.

2. Key module according to claim 1, wherein the means for dampening are configured to dampen the mechanical vibrations of the spring element during the entire movement of the actuation unit between the rest position and the actuated position.

3. Key module according to claim 1, comprising a keycap as actuation unit, wherein the spring element is formed as a tension spring, wherein the guide unit comprises two wing elements, between which the spring element is stretched in an assembled state of the key module, wherein the keycap is coupleable or coupled to the wing elements, wherein the damper element is arranged on the keycap.

4. Key module according to claim 3, wherein the damper element is formed as at least one web of the keycap, extending in a manner offset from a spring body axis of a spring body of the spring element along the spring body axis in an assembled state of the key module.

5. Key module according to claim 3, wherein the damper element and the spring element are arranged and formed to force the keycap into unilateral abutment against the wing elements of the guide unit in the rest position in the assembled state of the key module.

6. Key module according to claim 1, wherein the means for dampening comprise a medium with which at least the spring element is wetted, wherein the medium is a gel-like medium, a paste-like medium, a liquid or a fatty medium.

7. Key module according to claim 1, wherein the means for dampening comprise a material layer with which the spring element is at least partially coated, wherein the material layer comprises a material having a tensile strength which is less than a tensile strength of a material of the spring element.

8. Keyboard, wherein the keyboard comprises:

at least one key module according to claim 1; and a circuit substrate, wherein the at least one key module is arranged on the circuit substrate.

* * * * *